(12) United States Patent
Schuld

(10) Patent No.: US 9,288,946 B1
(45) Date of Patent: Mar. 22, 2016

(54) BIN SWEEP WITH INCLINED PORTION

(75) Inventor: Eric Schuld, Sioux Falls, SD (US)

(73) Assignee: Sioux Steel Company, Sioux Falls, SD (US)

( * ) Notice: Subject to any disclaimer, the term of this patent is extended or adjusted under 35 U.S.C. 154(b) by 839 days.

(21) Appl. No.: 13/558,775

(22) Filed: Jul. 26, 2012

(51) Int. Cl.
*B65G 65/00* (2006.01)
*A01F 25/20* (2006.01)
*B65G 65/46* (2006.01)
*B65G 65/42* (2006.01)
*B65G 69/08* (2006.01)

(52) U.S. Cl.
CPC ........... *A01F 25/2018* (2013.01); *B65G 65/425* (2013.01); *B65G 65/466* (2013.01); *B65G 69/08* (2013.01)

(58) Field of Classification Search
CPC .... B65G 65/466; B65G 65/425; B65G 21/10; B65G 65/40; B65G 65/42; B65G 69/08; A01F 25/2009; A01F 25/2018
USPC .................. 414/305, 306, 309, 310, 311, 307
See application file for complete search history.

(56) References Cited

U.S. PATENT DOCUMENTS

| | | | |
|---|---|---|---|
| 822,547 A | 6/1906 | Nicolson | |
| 2,646,023 A | 7/1953 | Virgil | |
| 2,801,137 A | 7/1957 | Clay | |
| 3,065,996 A | 11/1962 | Patz | |
| 3,067,914 A * | 12/1962 | Ellaby | 222/227 |
| 3,181,715 A | 5/1965 | Olson | |
| 3,204,786 A | 9/1965 | Kucera | |
| 3,228,514 A | 1/1966 | Kucera | |
| 3,229,665 A | 1/1966 | Baltz | |
| 3,231,106 A | 1/1966 | Bruecker | |
| 3,291,325 A | 12/1966 | Henningson | |
| 3,338,636 A | 8/1967 | Chapman | |
| 3,438,517 A | 4/1969 | Steffen | |
| 3,455,470 A | 7/1969 | Kanagy | |
| 3,472,357 A | 10/1969 | Strocker | |
| 3,647,094 A | 3/1972 | Jackson | |

(Continued)

FOREIGN PATENT DOCUMENTS

| | | |
|---|---|---|
| FR | 1032110 | 6/1953 |
| FR | 2309442 | 11/1976 |
| FR | 2348132 | 11/1977 |

OTHER PUBLICATIONS

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.

*Primary Examiner* — Saul Rodriguez
*Assistant Examiner* — Mark Hageman
(74) *Attorney, Agent, or Firm* — Jeffrey A. Proehl; Woods, Fuller, Shultz & Smith, P.C.

(57) ABSTRACT

An elongated sweep apparatus for moving particulate matter in a bin may comprise a sweep assembly movable over the floor of the bin and including a particulate sweep structure configured to move particulate matter toward the inboard end of the elongated sweep apparatus, and a housing generally extending between opposite ends of the sweep apparatus with a portion of the sweep structure being positioned in the housing. A first portion of the particulate sweep structure may extend along a primary movement axis and a second portion of the particulate sweep structure may extend along a secondary movement axis, and the primary movement axis may extend substantially parallel to the floor and the secondary movement axis being inclined upwardly from the primary movement axis.

20 Claims, 7 Drawing Sheets

(56) References Cited

U.S. PATENT DOCUMENTS

| | | |
|---|---|---|
| 3,828,916 A | 8/1974 | Patz |
| 3,908,840 A * | 9/1975 | Lambert, Jr. .................. 414/297 |
| 3,946,861 A | 3/1976 | Sandefur |
| 3,974,908 A | 8/1976 | Keichinger |
| 4,022,335 A * | 5/1977 | Lambert, Jr. .................. 414/298 |
| 4,242,028 A | 12/1980 | Van Dusen |
| 4,313,705 A | 2/1982 | Jackson |
| 4,329,105 A | 5/1982 | Buschbom |
| 4,516,898 A | 5/1985 | Cantenot |
| 4,619,577 A * | 10/1986 | Swanson ....................... 414/312 |
| 4,655,666 A | 4/1987 | Cantenot |
| 4,669,941 A * | 6/1987 | West et al. .................... 414/310 |
| 4,762,220 A | 8/1988 | Lutke |
| 4,773,808 A | 9/1988 | Fischer |
| 4,875,820 A | 10/1989 | Lepp |
| 4,998,855 A | 3/1991 | Tschernatsch |
| 5,088,871 A * | 2/1992 | Mellish ......................... 414/327 |
| 5,099,983 A | 3/1992 | Valdez |
| 5,186,596 A | 2/1993 | Boucher |
| 5,639,200 A | 6/1997 | Jiskoot |
| 5,769,590 A | 6/1998 | Weikel |
| 6,039,647 A | 3/2000 | Weikel |
| 6,254,329 B1 | 7/2001 | Sukup |
| 6,280,331 B1 | 8/2001 | Tuttlebee |
| 6,499,930 B1 | 12/2002 | Dixon |
| 6,948,902 B2 | 9/2005 | Hanig |
| 7,588,405 B2 | 9/2009 | Johnson |
| 8,770,388 B1 | 7/2014 | Chaon |
| 2004/0146381 A1* | 7/2004 | Hanson et al. ................ 414/306 |
| 2005/0263372 A1 | 12/2005 | Hollander |
| 2006/0245864 A1 | 11/2006 | Epp |
| 2010/0239399 A1 | 9/2010 | Hoogestraat |
| 2013/0064629 A1* | 3/2013 | Schuelke et al. ............. 414/327 |

* cited by examiner

BIN SWEEP WITH INCLINED PORTION

BACKGROUND

1. Field

The present disclosure relates to bin sweeps and more particularly pertains to a new bin sweep with inclined portion for increasing the effectiveness and efficiency with which particulate matter such as grain may be moved inside the bin.

2. Description of the Prior Art

Known bin sweeps are employed to move particulate matter, and in many applications grain particles, toward the center of the bin floor so that the grain is able to fall through an opening in the floor into a space, or sump, which is in communication with a conveyor that moves the grain below the floor from the sump to a location outside of the perimeter wall of the bin. The bin sweep is generally elongated with an inboard end that is positioned toward the center of the bin floor, and an outboard end that is positioned radially outward from the inboard end toward the perimeter wall of the bin. The perimeter of the bin is generally circular and the bin sweep rotates or pivots about the inboard end so that the outboard end moves along the circumference of the bin floor. Typically, the bin sweep makes a single pass about the bin interior and the sump to clear the bin of grain.

The bin sweep may often start the bin clearing operation buried in the grain. When operating, the bin sweep attempts to move forwardly, and in doing so, engages the grain piled in the bin interior and the sweep mechanism moves the grain to the inboard end and toward the sump. In the bin sweeps known in the art, the grain tends to fall into the sump only if the distance from the inboard end to the sump is not too far.

SUMMARY

In one aspect, the present disclosure relates to an elongated sweep apparatus for moving particulate matter in a bin having a bin floor on which the matter rests and a bin sump located toward a center of the bin floor. The sweep apparatus has an inboard end for locating toward a central area of the bin and an outboard end for locating toward a peripheral area of the bin. The sweep apparatus may comprise a sweep assembly movable over the bin floor, and the sweep assembly may in turn comprise a particulate sweep structure configured to move particulate matter toward the inboard end of the elongated sweep apparatus and a housing generally extending between the opposite ends of the sweep apparatus with a portion of the sweep structure being positioned in the housing. A first portion of the particulate sweep structure may extend along a primary movement axis and a second portion of the particulate sweep structure may extend along a secondary movement axis, with the primary movement axis extending substantially parallel to the floor and the secondary movement axis being inclined upwardly from the primary movement axis.

In another aspect, the disclosure relates to an elongated sweep apparatus for moving particulate matter in a bin having a bin floor on which the matter rests and a bin sump located toward a center of the bin floor. The sweep apparatus has an inboard end for locating toward a central area of the bin and an outboard end for locating toward a peripheral area of the bin. The sweep apparatus may comprise a sweep assembly movable over the floor of the bin, and the sweep assembly may comprise a particulate sweep structure configured to move particulate matter adjacent the sweep apparatus toward the inboard end of the elongated sweep apparatus. The particulate sweep structure may include a plurality of interconnected paddles movable in a succession on a path along at least a portion of the sweep assembly between the inboard and outboard ends and an endless loop member on which the paddles are mounted at spaced locations along the endless loop. The sweep assembly may also include a housing generally extending between the opposite ends of the sweep apparatus with a portion of the sweep structure being positioned in the housing. A first portion of the particulate sweep structure may extend along a primary movement axis and a second portion of the particulate sweep structure may extend along a secondary movement axis, with the primary movement axis extending substantially parallel to the floor and the secondary movement axis being angled upwardly from the primary movement axis. The housing may have a primary section extending generally along the primary movement axis and a secondary section extending generally along the secondary movement axis.

In still another aspect, the disclosure relates to a bin sweep system that may comprise a bin sump extending into the floor of the bin and located toward a center of the bin floor and a bin gearbox extending upwardly from the bin floor and having a rotatable drive shaft for supplying rotational power. The system may also include an elongated sweep apparatus for moving particulate matter across the bin floor on which the matter rests, the sweep apparatus having an inboard end locating toward the bin gearbox of the bin and an outboard end for locating toward a peripheral area of the bin. The sweep apparatus may comprise a sweep assembly movable over the floor of the bin, and the sweep assembly may comprise a particulate sweep structure configured to move particulate matter on the floor beneath the sweep apparatus toward the inboard end of the elongated sweep apparatus. The particulate sweep structure may include a plurality of interconnected paddles movable in a succession on a path along at least a portion of the sweep assembly between the inboard and outboard ends, and an endless loop member on which the paddles are mounted at spaced locations along the endless loop. The sweep assembly may also comprise a housing generally extending between the opposite ends of the sweep apparatus with a portion of the sweep structure being positioned in the housing, and a connection structure configured to connect the housing to the bin gearbox to guide movement of the sweep apparatus about the bin gearbox. A first portion of the particulate sweep structure may extend along a primary movement axis and a second portion of the particulate sweep structure may extend along a secondary movement axis, with the primary movement axis extending substantially parallel to the floor and the secondary movement axis being angled upwardly from the primary movement axis. The housing may have a primary section extending generally along the primary movement axis and a secondary section extending generally along the secondary movement axis.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
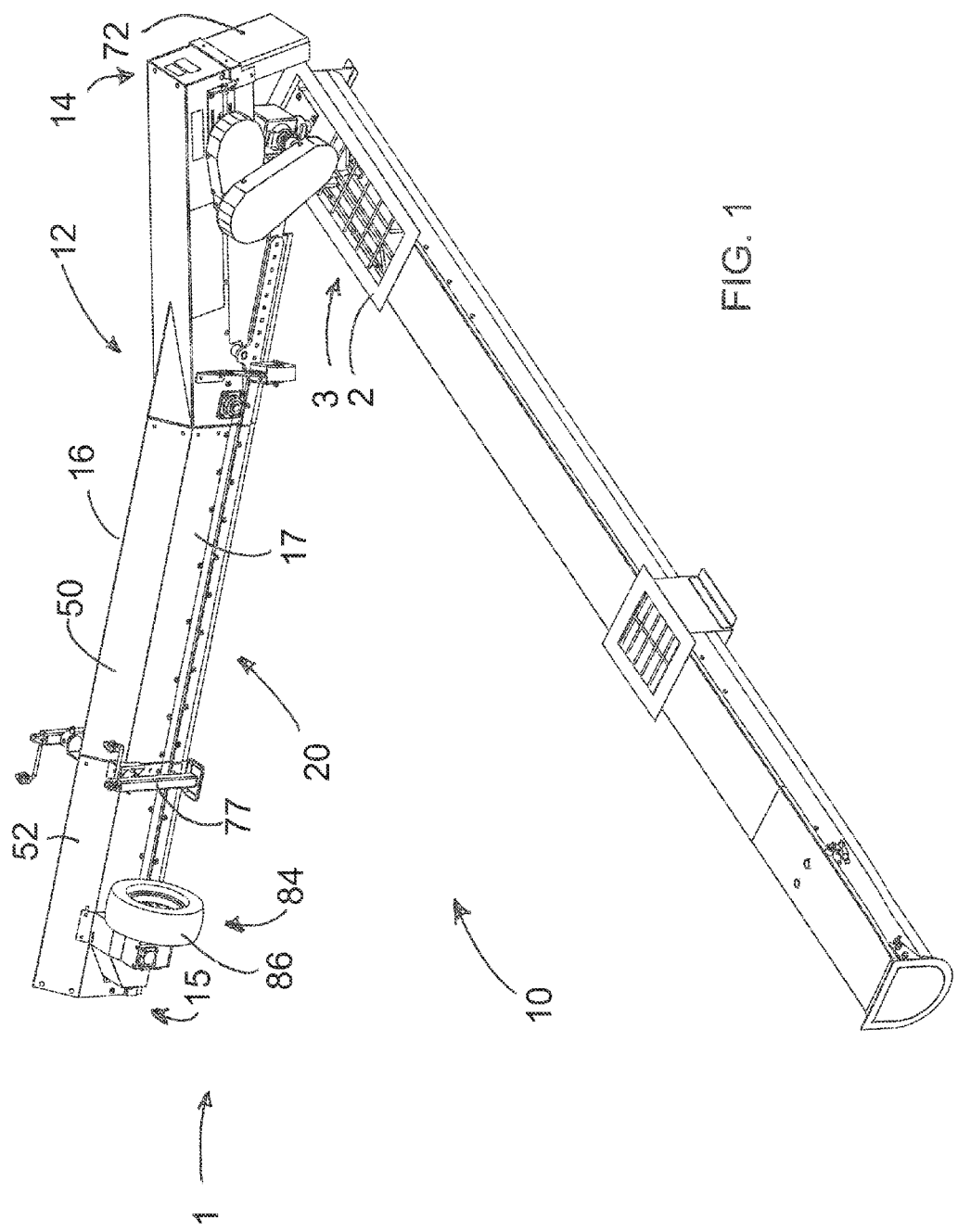
FIG. 1 is a schematic perspective view of a new bin sweep apparatus according to the present disclosure and shown in relation to a bin sump.
Figure 2:
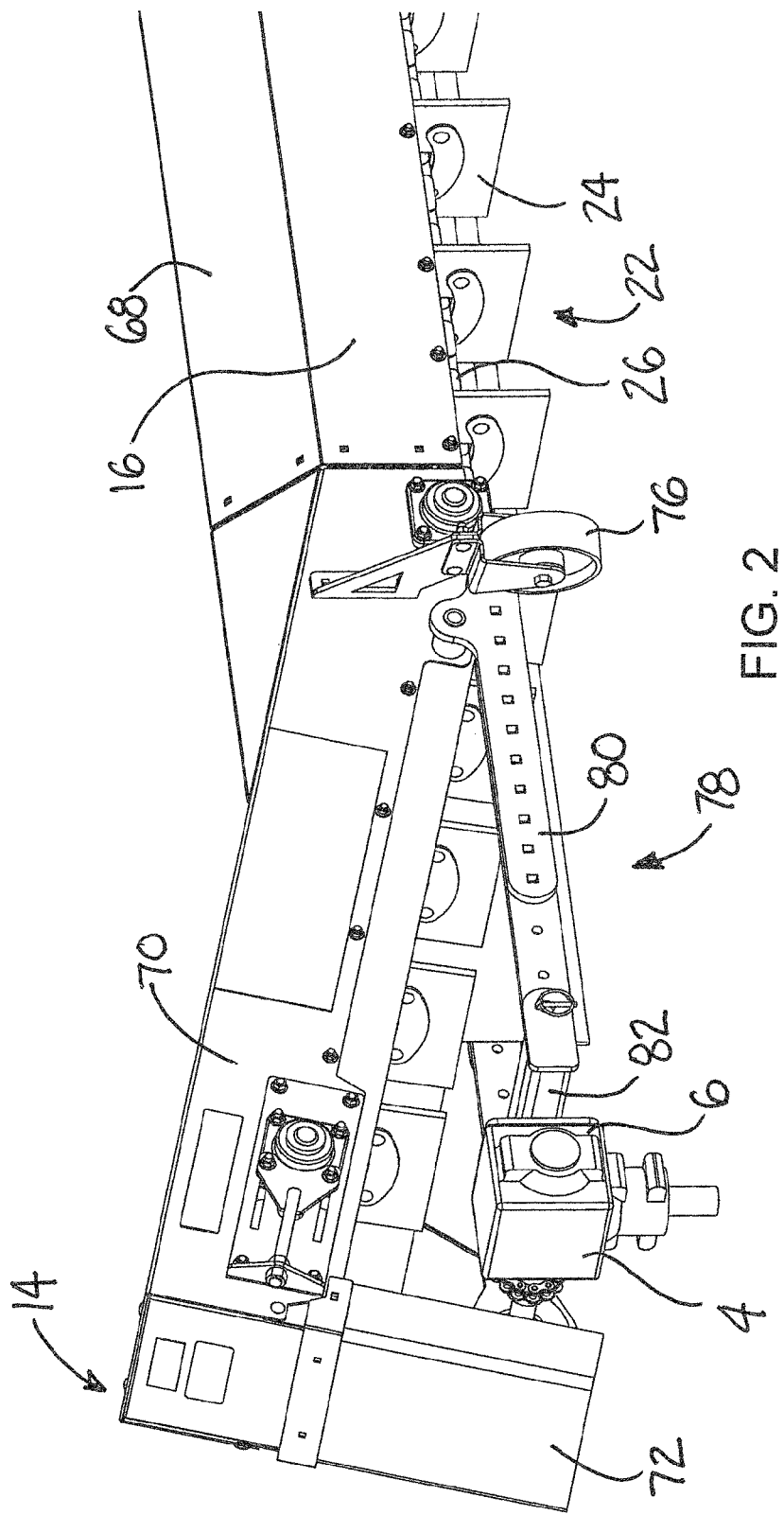
FIG. 2 is a schematic perspective view of the forward side of the inboard end portion of the sweep apparatus according to an illustrative embodiment and shown in relation to a bin gearbox.
Figure 3:
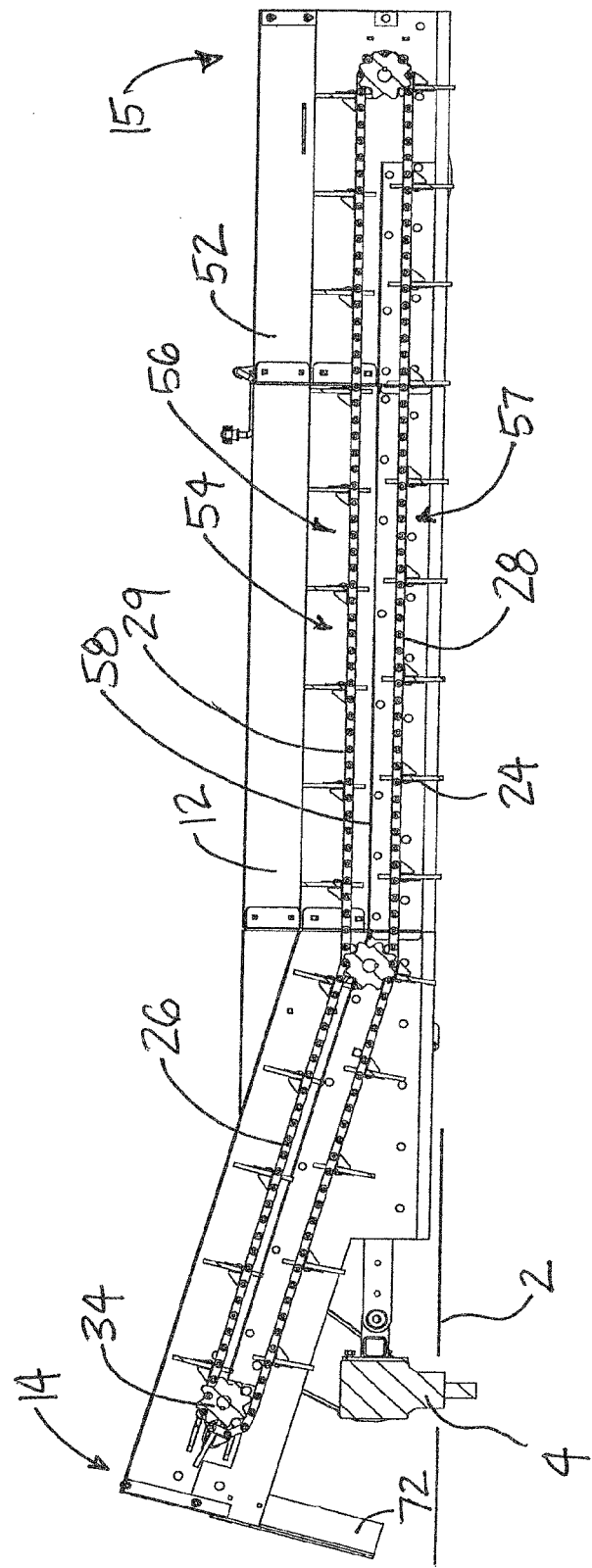
FIG. 3 is a schematic side sectional view of the sweep apparatus taken along a longitudinal plane.
Figure 4:
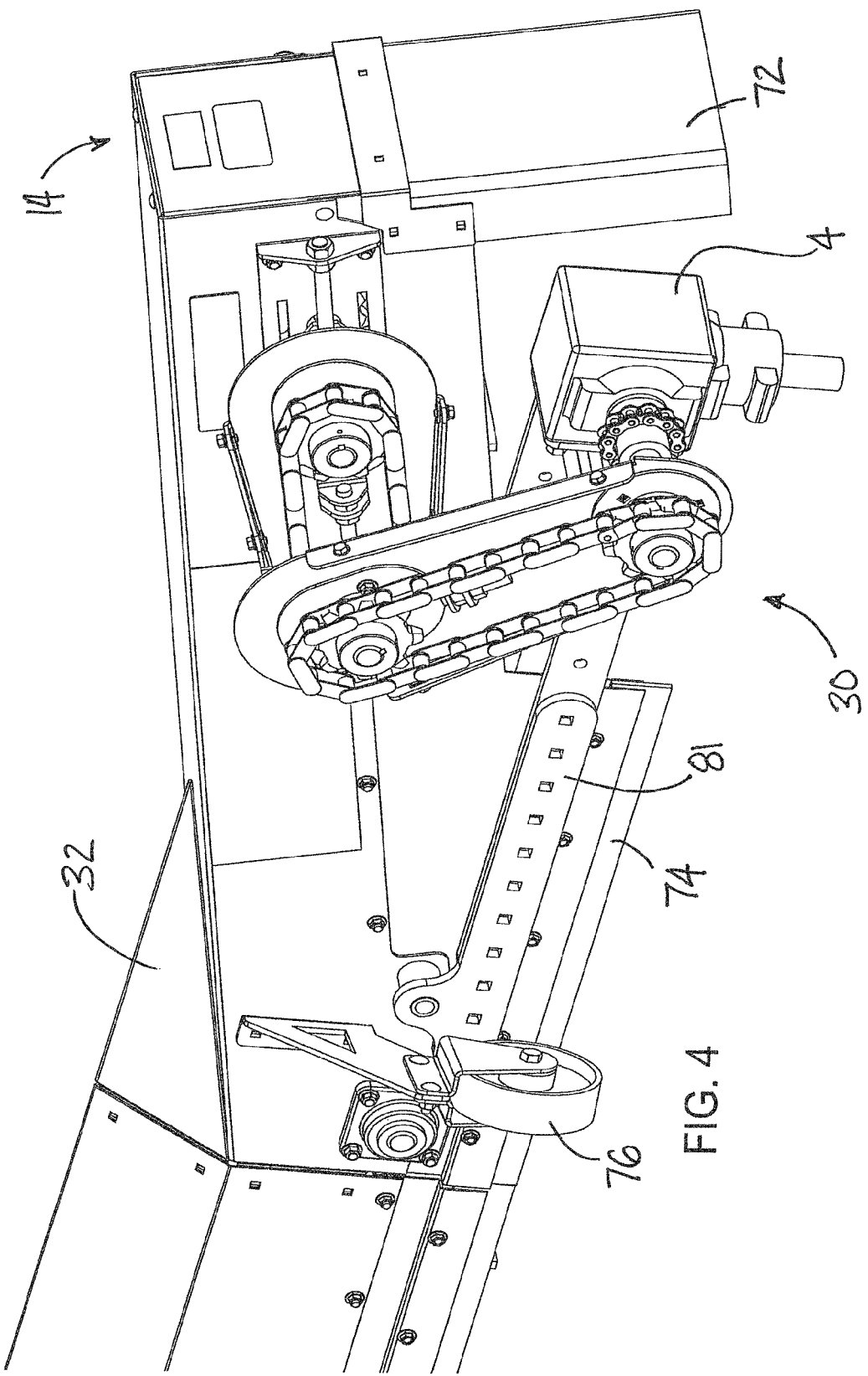
FIG. 4 is a schematic perspective view of the rearward side of the inboard end portion of the bin sweep apparatus according to an illustrative embodiment.
Figure 5:
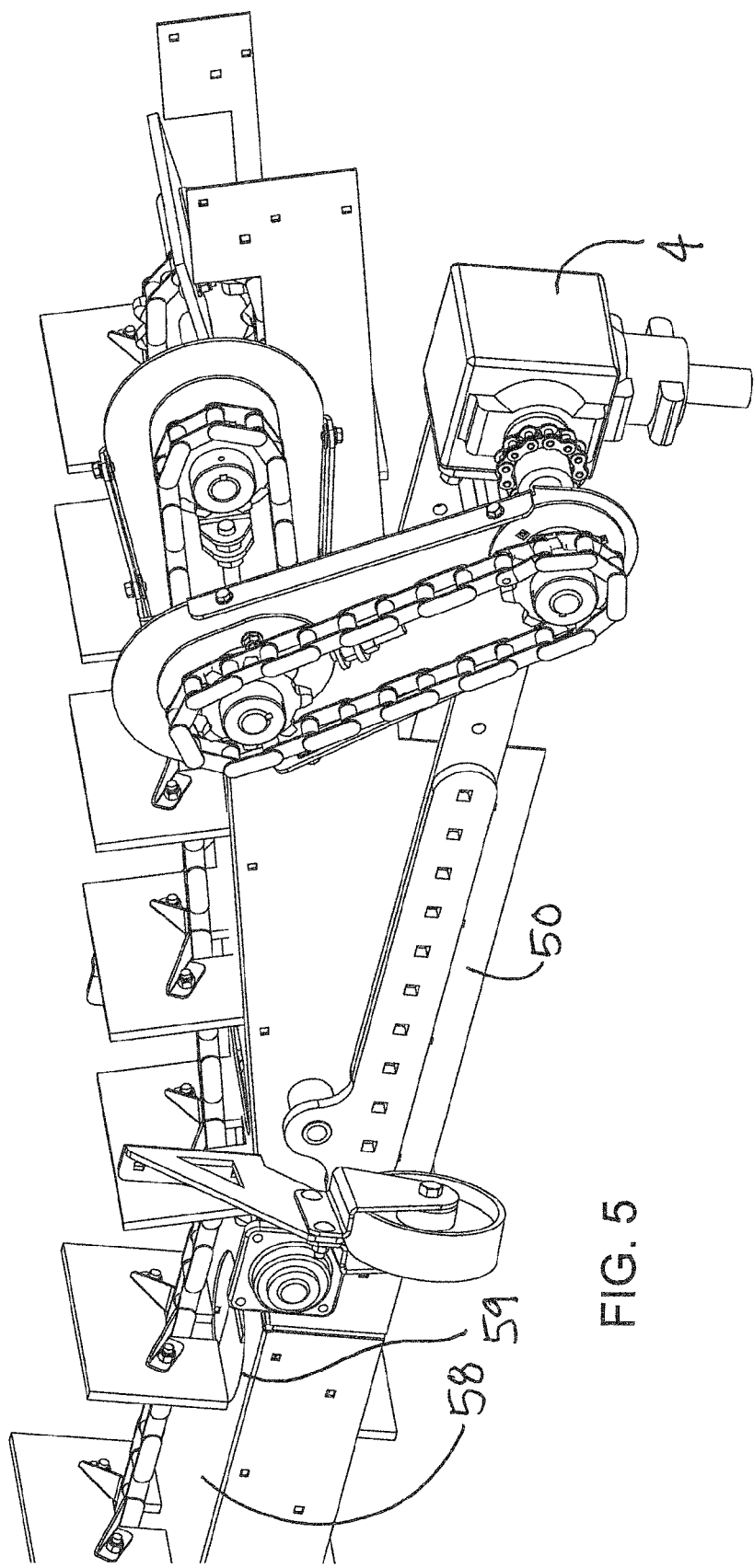
FIG. 5 is a schematic perspective view of elements of the sweep apparatus shown from the same viewpoint as FIG. 4 with parts removed to show detail.
Figure 6:
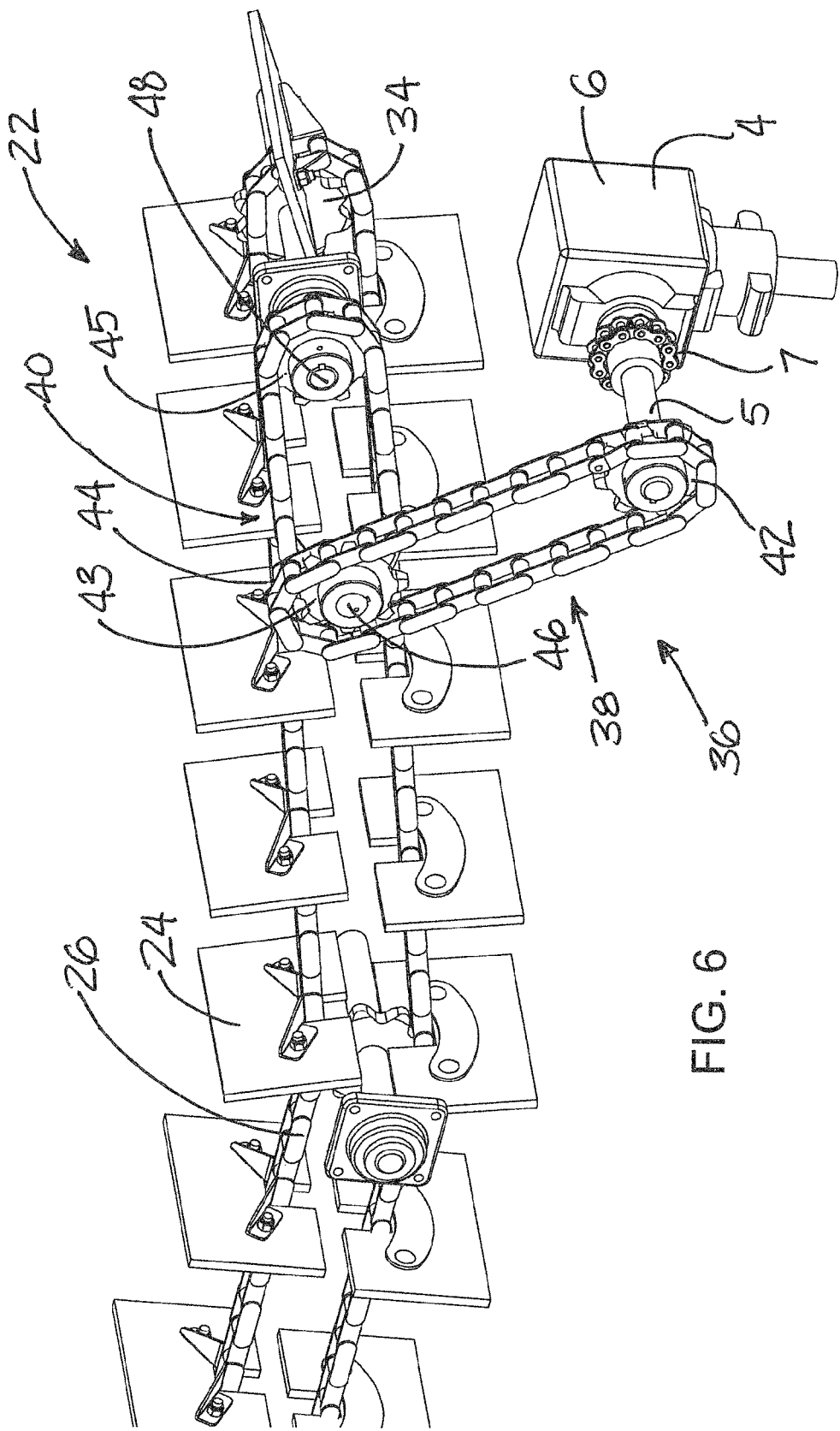
FIG. 6 is a schematic perspective view of the particulate sweep structure and drive linkage of the sweep assembly with other parts of the sweep apparatus removed to show detail.
Figure 7:
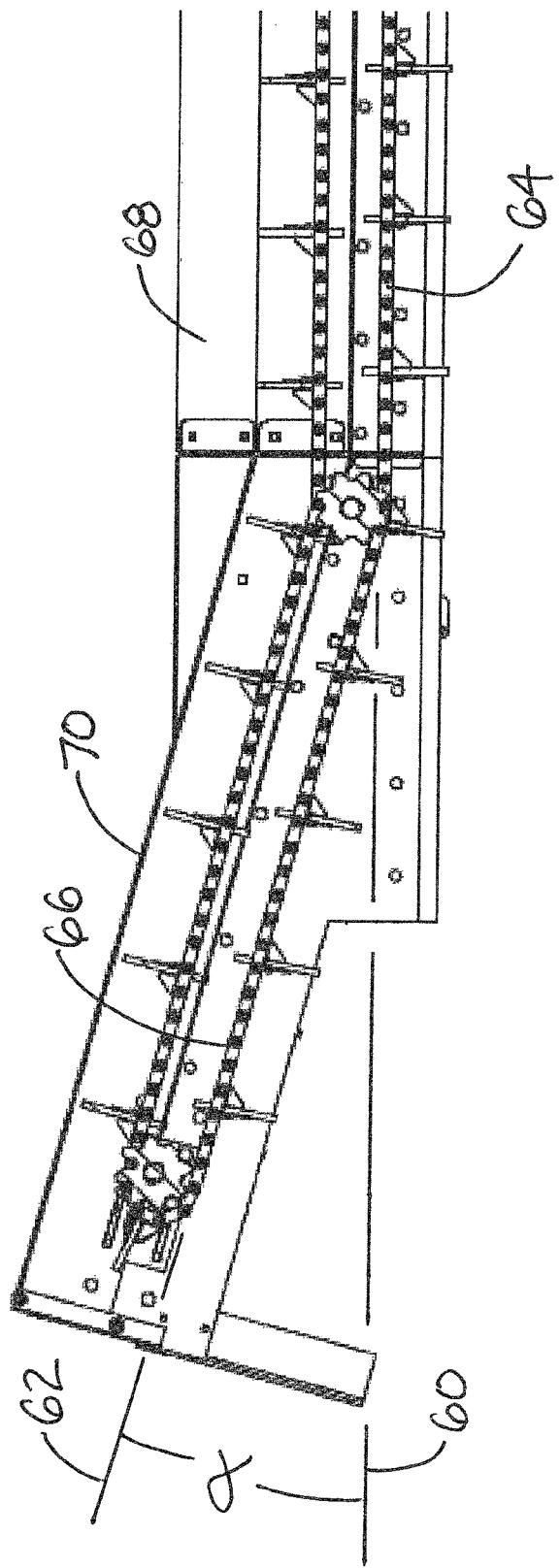
FIG. 7 is a schematic side sectional view of the inboard end portion of the sweep apparatus illustrating the orientations of various elements of the sweep apparatus.

With reference now to the drawings, and in particular to FIGS. 1 through 7 thereof, a new bin sweep with inclined portion that embodies the principles and concepts of the disclosed subject matter will be described.

While the sumps of many bins are positioned at the center of the bin floor, some sumps are offset to one side of the center and applicant has recognized that in bins having an offset or off-center sump, the spatial relationship of the inboard end of the sweep and the bin sump changes as the sweep rotates in a manner that does not occur in bins where the sump is centered. Applicant has also realized that the change in the relationship between the sweep and the sump can cause uneven or non-uniform movement of the grain into the sump. For example, at some points in the rotation of the bin sweep, the sweep may place grain on the bin floor in a location where the particles are unable or unlikely to fall into the sump and where the bin sweep is unlikely to again engage the grain accumulated in this manner to be able to move the grain into the sump. As a result, some grain may accumulate around the sump in one or more piles. To capture this grain, the user may have to enter the interior of the grain bin and shovel the stranded grain particles into the sump, but this practice is generally not encouraged even when the bin is substantially empty and regulations may require additional persons be present inside and outside of the bin to assist in the case of an accident. Otherwise, the bin sweep may be cycled to move about the bin interior for a second pass to catch the accumulations about the sump, but this is a time consuming and wasteful practice to simply capture the small amount of grain that may remain in the bin.

Applicant has discovered features for a bin sweep that significantly reduce, if not eliminate, the problem of grain being left beside the bin sump by previous bin sweep designs. One feature may include raising the head or inboard end of the bin sweep to a vertical height that is greater than the rest of the bin sweep. Another feature may include inclining or angling a section of the particulate sweep structure toward the inboard end in an upward direction with respect to the remainder of the particulate sweep structure which may be oriented substantially parallel to the surface of the bin floor. In some embodiments, the inclined section of the particulate sweep structure may be spaced above the surface of the bin floor such that the sweep structure is raised out of contact with the bin floor surface. Still another feature may include an inboard portion of the particulate sweep structure that is positioned above the pivot point about which the sweep rotates, and may also be positioned above a gearbox located at the pivot point that may be used to transfer rotational power to the bin sweep to operate the sweep.

In the broadest aspects, the disclosure relates to a bin sweep system 10 for moving particulate matter in a bin 1. In many applications, the particulate matter is grain, although the system is suitable for use with the storage of other types of materials that have a particulate character and that is relatively dry. The bin has a bin floor 2 on which the particulate matter rests and is piled. The bin may also have an outer perimeter that is circular, and a substantially cylindrical perimeter wall that extends upwardly from the floor to define the interior of the bin. A roof on the bin may complete the boundaries of the bin interior.

The bin sweep system 10 may further comprise a bin sump 3 that extends into the bin floor from an opening in the plane of the floor surface, and the sump opening may be covered by a grate or other structure that allows grain to pass through while preventing larger objects or agglomerations of grain particles to pass into the sump. Typically, the bin sump 3 is located toward the center of the bin floor, but in some installations the sump may be positioned to a side of the actual center point of the bin floor in an offset or off-center location. The system 10 may further include a bin gearbox 4 for supplying rotational power to the bin sweep from a source positioned below the floor or outside the perimeter of the bin. The bin gearbox 4 typically extends upwardly from the bin floor such that is protrudes a small distance above the plane of the bin floor surface. The bin gearbox 4 is located toward the center of the bin floor, and in most bins is located at the center of the bin floor, such as at the center point of the circular bin floor. The bin gearbox 4 may have a rotatable power shaft 5 that may extend from the gearbox housing 6 along a generally horizontal axis. The rotatable power shaft is rotated during operation by the power source, and in some installations may be rotated by the turning of the auger positioned underneath the bin floor. A coupling 7 may be located on an end of the power shaft 6 for making connections to apparatus to be powered by the gearbox.

Another aspect of the disclosure relates to an elongated sweep apparatus 12 that may form a part of the sweep system 10, such by being located in the bin 1 and being interfaced with the power shaft 5 to receive rotational power from the gearbox. Generally, the sweep apparatus 12 may rest upon the surface of the bin floor and move across the bin floor to engage and move grain particles that are piled on the floor. The sweep apparatus may rotate about a central area of the bin floor in a sweeping movement. The elongated sweep apparatus 12 may have opposite ends 14, 15, with one end being an inboard end 14 for locating toward to a central area of the bin and the other end being an outboard end 15 for locating toward a peripheral perimeter area of the bin floor. The sweep assembly has a forward side 16 that is intended to be oriented toward a direction of movement of the sweep apparatus and a rearward side 17 that is oriented away from the direction of movement.

In greater detail, the sweep apparatus 12 may comprise a sweep assembly 20 that is movable over the floor 2 of the bin. In some embodiments, the sweep assembly includes at least two units, with the units being arranged in a substantially linear array between the inboard 14 and outboard 15 ends of the sweep apparatus. Combining and connecting different numbers of units and units of different lengths may provide a variety of lengths between the inboard and outboard ends to accommodate bins having different floor diameters. Generally the units of the assembly may be modular to permit assembly of the units into the linear array. Some units may differ from others for special purposes and functionality as will be described below. With an accurate length achieved, the inboard end 14 may be positioned adjacent to the sump 3 and the outboard end may be positioned at the outer perimeter of the bin floor such that substantially all regions of the bin floor surface may be reached by the sweep assembly.

The sweep assembly 20 may comprise a particulate sweep structure 22 that is configured to move particulate matter on the bin floor beneath the sweep apparatus toward one end of the elongated sweep apparatus. The particulate sweep structure 22 may tend to move the particulate matter (such as grain) toward the inboard end 14 which may be located in the vicinity of the sump 3. The particulate sweep structure may comprise a plurality of interconnected paddles 24 movable in a succession on a path along at least a portion of the sweep assembly 20 between the inboard 14 and outboard 15 ends. The plurality of paddles 24 may be mounted on an endless loop member 26 at spaced locations along the endless loop, and may extend outwardly from the loop to depend downwardly to the floor along a portion of the path of the interconnected paddles. The endless loop member 26 may have an incoming stretch 28 generally moving along a portion of the path from the outboard end 15 toward the inboard end 14 and an outgoing stretch 29 generally moving along a portion of the path from the inboard end toward the outboard end. Generally, the incoming stretch 28 is located above the outgoing stretch, although this is not critical to the operation of the sweep structure as long as the incoming stretch is able to effectively contact and move the grain particles. It will be recognized that as the endless member (and the paddles connected thereto) move along the path, a point on the endless loop member will be constantly moving between positions on the incoming stretch and positions on outgoing stretch. The endless loop member may comprise a series of interconnected links, for example, a plurality of connected chain links, although other structures may be employed for the loop member.

The sweep assembly 20 may further comprise a paddle movement assembly 30 that is configured to move the plurality of interconnected paddles 24 along the path. In some of the most preferred embodiments, the paddle movement assembly 30 is configured to receive rotational power from the bin gearbox 3. The paddle movement assembly may be located in a power unit 32 of the plurality of units forming the sweep assembly 20, and the power unit may be positioned toward the inboard end 4 of the sweep apparatus.

The paddle movement assembly 30 may include a rotatable drive member 34 on which a portion of the endless loop member 26 may be engaged or entrained such that rotation of the drive member causes the loop member and the paddles to move along the path. The rotatable drive member 34 may be positioned toward the inboard end 14 of the sweep apparatus. The position of the rotatable drive member may be adjustable to adjust the proximity of the rotatable drive member to the inboard end 14 of the sweep apparatus, which in turn may adjust a degree of tension in the endless loop member 26. In some embodiments, and in particular those embodiments in which the endless loop member is a chain, the rotatable drive member may comprise a sprocket with alternating teeth and troughs.

The paddle movement assembly 30 may also comprise a drive linkage 36 that is configured to connect to the bin gearbox 4 to receive rotational power from the bin gearbox. The drive linkage may generally extend between the bin gearbox 4 and the rotatable drive member 3, and may have a variable effective length for adjusting to changes in the distance between the bin gearbox and the rotatable drive member during operation of the sweep apparatus. In greater detail, the drive linkage 36 may comprise a lower link assembly 38 for connecting to the bin gearbox to receive rotational power from the gearbox, and an upper link assembly 40 connecting the lower link assembly 38 to the rotatable drive member 34. The upper 40 and lower 38 link assemblies are movable with respect to each other to adjust to changes in the distance between the bin gearbox and the rotatable drive member, and in some embodiments the upper and lower link assemblies may be pivotable with respect to each other and the link assemblies may move in a scissors-like manner with respect to each other.

The link assemblies 38, 40 may each comprise a pair of sprockets and a chain loop linking the sprockets, although other suitable rotational power transfer means may be employed. One 42 of the sprockets of the lower link assembly 38 may be connected to the power shaft 5 of the bin gearbox 3, and another one 43 of the sprockets of the lower link assembly and one 44 of the sprockets of the upper link assembly are connected together, such as by a transfer shaft 46 such that the sprockets 43, 44 turn as a unit. The upper 40 and lower 38 link assemblies may be pivotable about the axis of the transfer shaft to provide the scissors-like motion. One 45 of the sprockets of the upper link assembly 40 may be connected to the rotatable drive member 34 to turn with the drive member, such as by a support shaft 48.

The sweep assembly 20 may also include a housing 50 generally extending between the opposite ends of the sweep apparatus, and the housing may comprise a plurality of segments 52 with each of the segments corresponding to one of the units of the sweep assembly. The housing may define an interior 54, and at least a portion of the particulate sweep structure 22 may be positioned in the interior of the housing. The interior 54 may have an upper space 56 and a lower space 57, with a housing floor 58 dividing the interior 54 into the upper space and the lower space. The lower space generally extends between the housing floor and the bin floor 2, and the incoming stretch 28 of the endless loop member (and the paddles connected thereto) may be generally located in the lower space. The outgoing stretch 29 of the endless loop member (and the paddles connected thereto) may be generally located in the upper space 56 of the housing. The housing floor 58 may have one or more access holes 59 for facilitating access as well as allowing any grain that is able to move into the upper space to fall through the holes 59 and be moved by the incoming stretch.

One feature of some embodiments of the sweep apparatus is that the particulate sweep structure 22 may extend along a primary movement axis 60 and a secondary movement axis 62. The secondary movement axis may be angled or inclined upwardly with respect to the primary movement axis. In some embodiments, the primary movement axis 60 may extend in a substantially horizontal orientation, which may be substantially parallel to the bin floor surface, and the secondary movement axis may be angled upwardly with respect to the primary movement axis. The secondary movement axis may thus be oriented at an angle $\alpha$ with respect to the primary movement axis. In some embodiments, the angle may have a measurement from approximately 10 degrees to approximately 45 degrees, and in some embodiments the angle may have a measurement from approximately 15 degrees to approximately 35 degrees, and in some embodiments the angle may have a measure of approximately 20 degrees.

In embodiments in which the sweep structure has primary and secondary movement axes, the endless loop member 26 may have a first extent 64 that extends substantially along the primary movement axis 60 and a second extent 66 that extends substantially along the secondary movement axis 60. Each of the first 64 and second 66 extents may include portions of the incoming and outgoing stretches. An angle between the first and second extents may be similar or approximately equal to the angle $\alpha$.

The housing 50 may have a primary section 68 and a secondary section 70, with the primary section extending generally along and substantially parallel to the primary movement axis 60 and the secondary section extending generally along and substantially parallel to the secondary movement axis 62.

The sweep assembly 20 may also include a deflection structure 72 that extends downwardly from the housing 50 at the inboard end 14 and toward the bin floor 2 to help direct grain particles that have passed over the gearbox in a downward direction. The deflection structure 72 may have a degree of flexibility such that it is able to bend if it comes into contact with a relatively immovable object or with piled grain. The sweep assembly 20 may further include a drag member 74 that extends downwardly from the housing 50 toward the bin floor, may extend generally from the outboard end 15 toward the inboard end 14, and may be positioned toward the rearward side of the sweep apparatus. The drag member 74 may be flexible to follow a contour of the surface of the bin floor.

At least one inward support wheel 76 may be mounted on the housing toward the inboard end 14 of the sweep apparatus to at least partially support the housing 50 as well as other elements above the bin floor. In some embodiments, a pair of the support wheels 76 may be utilized, and the wheels may be located on opposite sides of the housing. In some implementations, additional supports 77 may be used along the length of the housing to provide additional or supplemental support to the housing, such as when the sweep apparatus is buried in grain. The degree to which the supports 77 provide the additional support may be adjustable, and in some embodiments the support 77 comprises a jack of the type often used on trailer tongues, although other structures may also be suitably employed.

The sweep apparatus 12 may comprise a connection structure 78 that is configured to connect the sweep apparatus 12 to the bin gearbox 4 to guide movement of the sweep apparatus about the bin gearbox. The connection structure may be pivotally connected to the housing 50 to permit the housing to rise and fall with respect to the bin gearbox if the elevation of the bin floor varies. The connection structure may be connected to the primary section 68 of the housing although this is not critical. An effective length of the connection structure 78 may be adjustable to adjust a distance between the bin gearbox 4 and the primary section 68 of the housing. The connection structure may include at least one arm 80 pivotally connected to the housing 50 and connected to the bin gearbox. In some embodiments, the connection structure may comprise a pair of laterally-spaced arms 80, 81 and a cross member 82 that extends between the arms. The cross member 82 may be connected to the bin gearbox.

A sweep drive assembly 84 of the sweep apparatus 12 may be mounted on the sweep assembly 14 to move the sweep assembly across the bin floor. Typically, although not necessarily, the sweep drive assembly is located toward the outboard end 15 of the sweep apparatus. In some of the most preferred embodiments, the sweep drive assembly 84 may be driven or powered by the movement of the particulate sweep structure 22, using the movement of the endless loop member 26 to turn a sprocket that is connected to and rotates a wheel 86 of the drive assembly 84. The drive assembly 84 may push the sweep assembly in a forward direction, which due to the connection of the sweep assembly to the bin gearbox (or other central bin structure) causes the sweep assembly to rotate about the center of the bin.

One advantage of the angled or inclined secondary section 70 of the housing, and the second extent of the loop member with the paddles, may be that the particulate sweep structure 22 is able to be located closer to the center of the bin floor than might otherwise be possible with sweeps that lack this feature. Another advantage of the angled structures may be that the inboard end 14 of the sweep apparatus is able to be positioned at a vertical level that is higher than the bin gearbox, and may be positioned above and over the gearbox in some embodiments. The positioning of the sweep assembly relative to the gearbox tends to allow the sweep structure 22 to throw or propel grain particles past or over the gearbox, which is useful when the sump is in an offset location from the center and the sweep assembly 20 is located on an opposite side of the gearbox from the sump. It will be recognized that the advantages of the sweep apparatus 10 are not limited to bins in which a bin gearbox supplies power to the apparatus 10, and may be used when the sweep is powered, for example, by an integrated electric motor.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An elongated sweep apparatus for moving particulate matter in a bin having a bin floor on which the matter rests, a bin sump located toward a center of the bin floor, and a bin gearbox at least partially located in the bin sump, the sweep apparatus having an inboard end for locating toward a central area of the bin and an outboard end for locating toward a peripheral area of the bin, the sweep apparatus comprising:
   a sweep assembly movable over the floor of the bin, the sweep assembly comprising a particulate sweep structure configured to move particulate matter toward the inboard end of the elongated sweep apparatus, and a housing extending between the opposite ends of the sweep apparatus with a portion of the sweep structure being positioned in the housing; and
   a connection structure configured to link the sweep assembly to the bin gearbox in a manner that maintains a portion of the particulate sweep structure over the bin sump at all rotational positions of the sweep assembly in the bin;
   wherein a first portion of the particulate sweep structure extends along a primary movement axis and a second portion of the particulate sweep structure extends along a secondary movement axis, the primary movement axis extending substantially parallel to the floor and the secondary movement axis being inclined upwardly from the primary movement axis.

2. The apparatus of claim 1 wherein the second portion of the particulate sweep structure is located toward the inboard end and the first portion is located toward the outboard end.

3. The apparatus of claim 1 wherein the housing has a primary section extending along the primary movement axis and a secondary section extending along the secondary movement axis.

4. The apparatus of claim 1 wherein the secondary movement axis is angled upwardly from the primary movement axis at an angle with respect to the primary movement axis.

5. The apparatus of claim 4 wherein the angle has a measurement of approximately 10 degrees to approximately 45 degrees.

6. The apparatus of claim 1 wherein the particulate sweep structure includes a plurality of interconnected paddles movable in a succession on a path along at least a portion of the sweep assembly between the inboard and outboard ends, the path having portions on opposite horizontal sides of a vertical axis passing through the bin gearbox when the connection structure is linked to the bin gearbox.

7. The apparatus of claim 6 wherein the plurality of paddles are mounted on an endless loop member at spaced locations along the endless loop.

8. The apparatus of claim 7 wherein the endless loop member has a first extent extending substantially along the primary movement axis and a second extent extending substantially along the secondary movement axis.

9. The apparatus of claim 1 additionally comprising a deflection structure extending downwardly from the housing at the inboard end toward the bin floor, of the housing, the deflection structure being flexible.

10. An elongated sweep apparatus for moving particulate matter in a bin having a bin floor on which the matter rests and a bin sump located toward a center of the bin floor, the sweep apparatus having an inboard end for locating toward a central area of the bin and an outboard end for locating toward a peripheral area of the bin, the sweep apparatus comprising
    a sweep assembly movable over the floor of the bin, the sweep assembly comprising a particulate sweep structure configured to move particulate matter toward the inboard end of the elongated sweep apparatus, and a housing extending between the opposite ends of the sweep apparatus with a portion of the sweep structure being positioned in the housing; and
    a drive linkage configured to connect the particulate sweep structure to a bin gearbox to receive rotational power from the bin gearbox, the drive linkage having a variable effective length for adjusting to changes in a distance between the bin gearbox and the particulate sweep structure;
    wherein a first portion of the particulate sweep structure extends along a primary movement axis and a second portion of the particulate sweep structure extends along a secondary movement axis, the primary movement axis extending substantially parallel to the floor and the secondary movement axis being inclined upwardly from the primary movement axis.

11. The apparatus of claim 10 wherein the drive linkage comprises a lower link assembly for connecting to the bin gearbox to receive rotational power from the gearbox and an upper link assembly connecting the lower link assembly to the particulate sweep structure, the link assemblies being movable with respect to each other to change the effective length of the drive linkage.

12. The apparatus of claim 11 wherein the upper and lower link assemblies pivot in a scissors-like manner with respect to each other.

13. The apparatus of claim 10 additionally comprising a connection structure for connecting the sweep apparatus to the bin gearbox in a manner such that a portion of the particulate sweep structure is maintained over the bin gearbox at all rotational positions of the sweep assembly on the bin floor.

14. An elongated sweep apparatus for moving particulate matter in a bin having a bin floor on which the matter rests, the bin having a bin sump located toward a center of the bin floor and a bin gearbox at least partially located in the bin sump, the sweep apparatus having an inboard end for locating toward a central area of the bin and an outboard end for locating toward a peripheral area of the bin, the sweep apparatus comprising:
    a sweep assembly movable over the floor of the bin, the sweep assembly comprising:
      a particulate sweep structure configured to move particulate matter adjacent the sweep apparatus toward the inboard end of the elongated sweep apparatus, the particulate sweep structure including a plurality of interconnected paddles movable in a succession on a path along at least a portion of the sweep assembly between the inboard and outboard ends and an endless loop member on which the paddles are mounted at spaced locations along the endless loop;
      a housing extending between the opposite ends of the sweep apparatus with a portion of the sweep structure being positioned in the housing;
      a connection structure configured to link the sweep assembly to the bin gearbox in a manner that maintains at least some paddles of the plurality of interconnected paddles of the particulate sweep structure over the bin sump as the sweep assembly rotates in the bin; and wherein a first portion of the particulate sweep structure extends along a primary movement axis and a second portion of the particulate sweep structure extends along a secondary movement axis, the primary movement axis extending substantially parallel to the floor and the secondary movement axis being angled upwardly from the primary movement axis, the second portion of the particulate sweep structure being maintained over the bin gearbox at all rotational positions of the sweep assembly in the bin.

15. The apparatus of claim 14 wherein the connection structure is configured to position the sweep assembly with respect to the bin gearbox such that a vertical rotation axis of the sweep assembly intersects the secondary movement axis of the particulate sweep structure as the sweep assembly rotates.

16. The apparatus of claim 14 additionally comprising a drive linkage configured to connect the particulate sweep structure to the bin gearbox to receive rotational power from the bin gearbox, the drive linkage having a variable effective length for adjusting to changes in a distance between the bin gearbox and the particulate sweep structure.

17. A bin sweep system comprising:
- a bin sump extending into the floor of the bin, the bin sump being located toward a center of the bin floor;
- a bin gearbox extending upwardly from the bin floor and having a rotatable drive shaft for supplying rotational power;
- an elongated sweep apparatus for moving particulate matter across the bin floor on which the matter rests, the sweep apparatus having an inboard end locating toward the bin gearbox of the bin and an outboard end for locating toward a peripheral area of the bin, the sweep apparatus comprising:
    - a sweep assembly movable over the floor of the bin, the sweep assembly comprising:
        - a particulate sweep structure configured to move particulate matter on the floor beneath the sweep apparatus toward the inboard end of the elongated sweep apparatus, the particulate sweep structure including a plurality of interconnected paddles movable in a succession on a path along at least a portion of the sweep assembly between the inboard and outboard ends and an endless loop member on which the paddles are mounted at spaced locations along the endless loop;
    - a housing extending between the opposite ends of the sweep apparatus with a portion of the sweep structure being positioned in the housing; and
    - a connection structure connecting the housing to the bin gearbox to guide movement of the sweep apparatus about the bin gearbox, the connection structure connecting the housing to the bin gearbox with a path of the interconnected paddles being intersected by a vertical axis of the bin gearbox at all rotational positions of the sweep assembly the bin;
    wherein a first portion of the particulate sweep structure extends along a primary movement axis and a second portion of the particulate sweep structure extends along a secondary movement axis, the primary movement axis extending substantially parallel to the floor and the secondary movement axis being angled upwardly from the primary movement axis, the housing having a primary section extending along the primary movement axis and a secondary section extending along the secondary movement axis.

18. The system of claim 17 wherein the inboard end of the sweep apparatus extends over the bin gearbox.

19. The system of claim 17 wherein a portion of the particulate sweep structure extends over the bin gearbox.

20. The system of claim 17 wherein the sweep apparatus additionally comprises a drive linkage connecting the particulate sweep structure to the bin gearbox to receive rotational power from the bin gearbox, the drive linkage having a variable effective length for adjusting to changes in a distance between the bin gearbox and the particulate sweep structure.

* * * * *